United States Patent
Simson et al.

(10) Patent No.: US 6,478,187 B2
(45) Date of Patent: Nov. 12, 2002

(54) COMPACT VENDING MACHINE

(76) Inventors: Anton K. Simson, 14530 Espola Rd., Suite A, Poway, CA (US) 92064; Frank Ruskin, 225 W. 38th St., Los Angeles, CA (US) 90037; Henri J. A. Charmasson, 2030 Sunset Blvd., San Diego, CA (US) 92103; Todd A. Simson, 13025 Sundance Ave., San Diego, CA (US) 92129

( * ) Notice: Subject to any disclaimer, the term of this patent is extended or adjusted under 35 U.S.C. 154(b) by 70 days.

(21) Appl. No.: 09/794,521

(22) Filed: Feb. 26, 2001

(65) Prior Publication Data

US 2002/0117510 A1 Aug. 29, 2002

(51) Int. Cl.[7] ............................................... G07F 11/00
(52) U.S. Cl. ......................................... 221/75; 221/129
(58) Field of Search ........................ 221/75, 68, 197, 221/7, 13, 131, 129, 249; 312/42, 72, 117

(56) References Cited

U.S. PATENT DOCUMENTS 5,553,736 A  * 9/1996  Healis ........................ 221/101
6,330,958 B1 * 12/2001  Ruskin et al. .............. 221/197

* cited by examiner

Primary Examiner—Kenneth W. Noland
(74) Attorney, Agent, or Firm—Henri J.A. Charmasson; John D. Buchaca

(57) ABSTRACT

A vending machine is housed in a light, yet sturdy enclosure made of an external sheet metal shell and an internal seamless plastic liner between which a volume of expanded synthetic foam material is injected. One or more good-holding magazines are removably held within the enclosure. A keypad, alpha-numerical display and card reader are packaged in the door closing the front of the enclosure. A driving motor module and a coin acceptor are removably mounted against the inside liner. Due to the absence of complex or delicate structure, the machine can be serviced, cleaned and sanitized within minutes. A pair of vending machine, one holding snack food, the other beverage cans are coupled to work together and dispense combinations of items from a single control panel. Both the beverage and snack food holding magazines are driven from the same type of motor module mounted inside the liner.

13 Claims, 8 Drawing Sheets

COMPACT VENDING MACHINE

FIELD OF THE INVENTION

This invention relates to vending machines, and more specifically to the type of vending machines found on jobsites capable of distributing pastries, small snack items and beverages.

BACKGROUND OF THE INVENTION

Conventional vending machines for pastries, candy bars, soda cans and other snack products must be able to hold a substantial inventory of goods so that they do not need to be serviced too often. Accordingly, they tend to be bulky and heavy and occupy about a square meter (10 square feet) of floor space, with a height of almost 2 meters (72 inches).

The reloading of such a machine is time consuming since items must be inserted one by one, and inventory of unsold items must be checked for expiration date, and, occasionally, replaced. Cash must then be collected and counted by the servicing employee. The good-holding stations must be cleaned of all oil and grease that may have oozed out of the packaged goods. These cumbersome procedures are time-consuming, labor intensive, and sometimes give occasion for pilferage and theft.

Conventional machines are not well-adapted to small job sites having 150 employees or less, because the profit generated at such a small site can not justify the labor cost of servicing the machines.

U.S. Pat. No. 4,236,649 Fellner et al. offers a partial solution to the above-mentioned problems by the use of a removable and replaceable magazine for the goods which can be loaded in the factory then used to replace an empty magazine or partially empty one. However, this type of magazine is relatively inefficient since it can hold only one item of goods in each location. Moreover, the coins need still be collected and counted on site. The same type of shortcomings characterize the vending machine disclosed in U.S. Pat. No. RE. 32,115 Lockwood et al. which uses a drum carousel to hold the goods to be sold. Although an empty carousel could be removed and replaced by a fully loaded one, each carousel station can only hold one item, and the cash must be handled separately. The inefficient designs of the above-devices inevitably leads to bulky vending machines which are not suitable for small locations.

The instant invention results from an attempt to palliate these various shortcomings.

SUMMARY OF THE INVENTION

The principal and secondary objects of this invention are to substantially reduce the time and expense involved in the refilling and maintenance of vending machines distributed at a plurality of locations over a given period, to reduce any losses due to pilferage of goods or conversion of payment currency by maintenance personnel, and reduce the health hazard occasioned by spillage of beverage and food items within the vending machines.

These and other valuable objects are achieved by the use of compact vending machines in which all the dispensable goods are held within a removable and substitutable magazine. Sets of magazines are filled in a central location then delivered to a plurality of vending machines along a predetermined route. At each location, the servicing of the machine consists essentially in opening the machine, removing the previously installed magazine, installing a fresh new magazine, and securing the vending machine in the absence of any other maintenance counting or inventory-taking of remaining goods, item by item or counting of any collected currency. Payments are made through debit cards sold by the vending machine operators to owners of locations for distribution to their employees and customers. Payments can also be made by currency which, once deposited into the machine, are securely accumulated within the magazines and can only be retrieved at the central location with use of a special key. The selection of desired goods and payment therefor can also be made through wireless communication with a cell-phone or other hand-held device. At certain locations, combinations of beverage and snack food item vending machines work together to deliver specially advertised combinations obtainable at a discount price. Magazines returned to the central location are emptied of any unsold goods and collected currency, cleaned, sanitized adn refilled with fresh goods before being assigned to a route for distribution to a new location.

The machine is opened by means of a chip-mounting, also called "smart" card. Upon opening, the machine automatically "down-loads" on the card, an account of all the sales that occurred since the last service call, including the amount of currency accumulated in the coin box. The card is returned along with the removed magazine to the distribution center where it is used to verify the integrity of the returned components and thus, deters pilferage by the service personnel.

DESCRIPTION OF THE PREFERRED EMBODIMENT OF THE INVENTION

Figure 1:
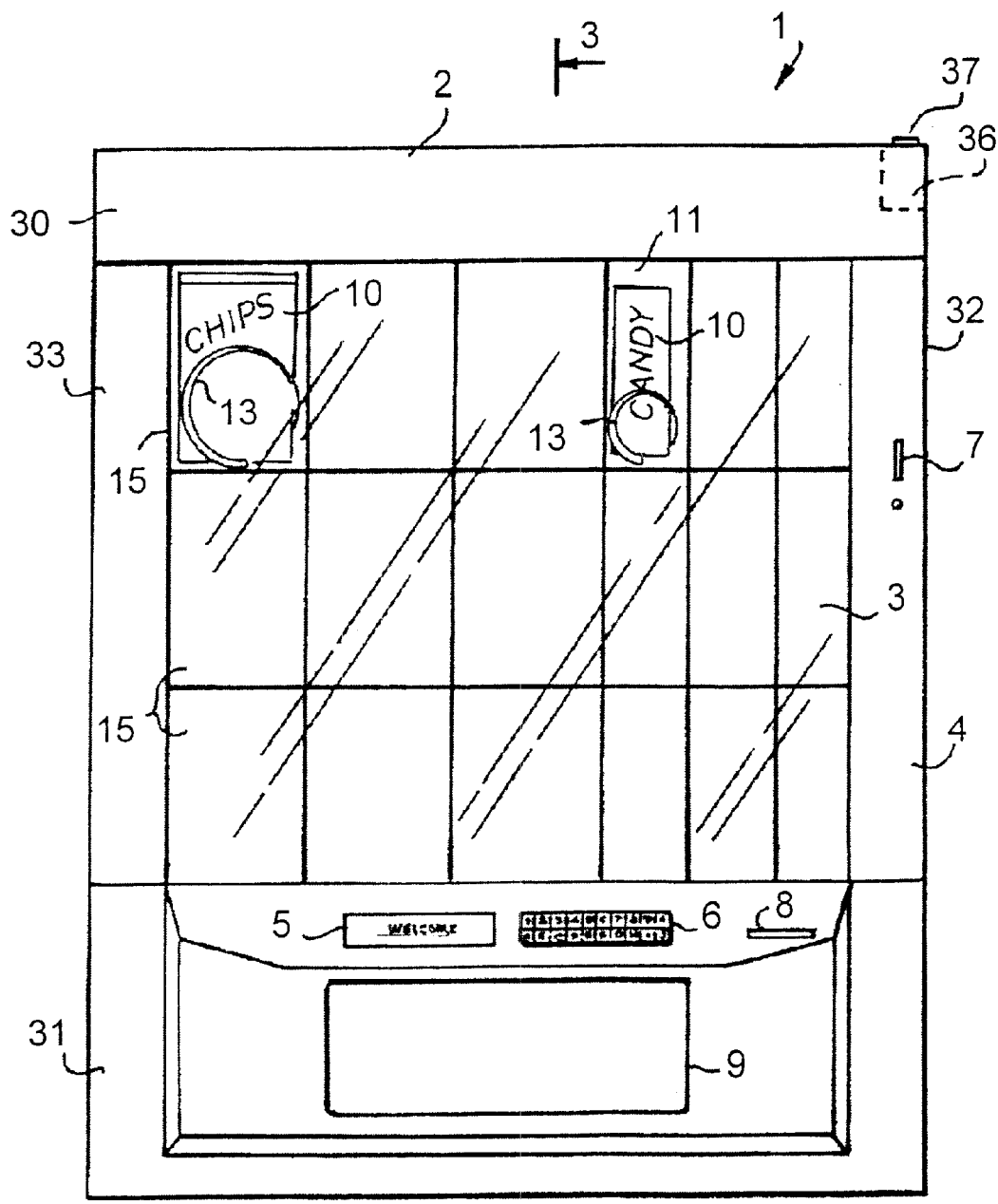
FIG. 1 is a front elevational view of a snack-food vending machine.
Figure 2:
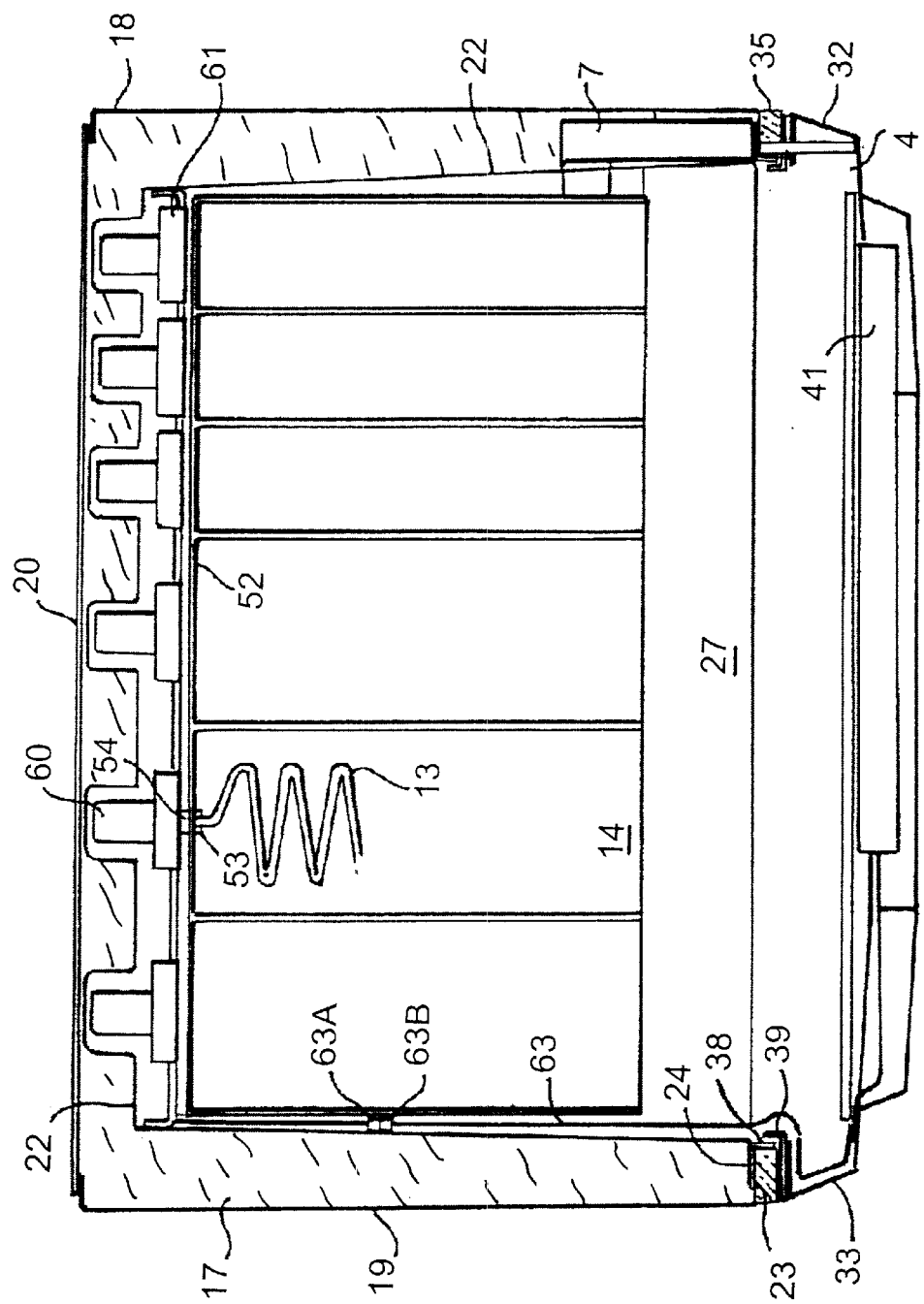
FIG. 2 is a horizontal, median cross-sectional view thereof.

Referring now to the drawing, there is shown a compact, counter top vending machine 1 housed in a molded plastic and sheet metal cabinet 2. A substitutable, quadrangular magazine 3 is securely held into the cabinet behind the cabinet front door 4. The customer interface includes a message display 5, a keypad 6 upon which the selection of a desired goods can be made, a currency-acceptor 7, a card reader 8 and a dispensing pocket 9. The goods 10 and the numbers of the stations or cells 11 holding them can be observed through the transparent door of the cabinet.

Each station or cell 11 can hold a plurality of goods having the same sale price. Each station is identified by a letter (A–C) and a number (1–6). In each station 11, a plurality of goods are held between the coils of a spiral rack 13. These goods may be of various configurations or sizes. When a spiral rack is rotated, it acts as an Archimedes screw, and shifts the goods toward the access port 14 along the front of the magazine. The magazine comprises three trays or layers 15 of good-holding station units. It should be understood that the number of stations in each unit and the number of units in a magazine can be varied to accommodate different sizes and varieties of goods. Typically, small goods such as candy bars can be loaded on a narrow cells such as the one shown on the right side of each tray. Large items such as pastries and potato chip packs that require a larger cell, can be loaded into stations such as the ones shown on the center and left side of each tray.

The lower, lateral corner of the magazine 3 rests upon shelf 16 formed inside the cabinet.

The cabinet 2 comprises an external shell 18 made of a first sheet 19 of metal bent to form the top and two opposite lateral walls a second sheet 20 closing the back of the cabinet and a third sheet 21 forming the bottom.

A plastic liner 22 is nested within the shell 18 and through its open front. The shell and liner are joined about their respective flanged, peripheral frontal edges 23, 24. The liner defines a cavity closed by the door 4. The cavity is divided into a load compartment 26 which occupies its major portion, and the pocket or receptacle 9 that receives the delivered goods below the load compartment.

The shelf 16 that separates the load compartment and the pocket is supported by an angled plate 28 secured to the three sheets 19, 20, and 21 forming the shell.

A volume of expanded, insulating polyurethane resin foam material 17 is injected between the liner 22 and the shell, excluding the space 29 defined under the angled plate 28. Once solidified, the foam material combines with the shell and liner to form a strong, yet light box. The external shell can thus be made of relatively thin sheet material whether steel, aluminum of plastic, typically, 2 mm thick. Similarly, the thickness of the plastic liner can be limited to approximately 1.5 mm.

The structural components of the door 4 comprise a molded top piece 30, a molded bottom piece 31 and two extruded lateral pillars 32, 33 joining the top and bottom pieces. Those four components frame a transparent polycarbonate window panel 34. The door is hinged along the external edge of the left pillar 33 to the joined flanged left sides of the shell and liner peripheral edges. The top and bottom pieces and the pillars are flanged along their external edges so that when the door meets the joined peripheral edges of the shell and liner, the vertical center portions of the door stand apart from the front edge of the cabinet. The space therebetween defines a chute 27 through which the selected goods fall toward the pocket 9. A resiliently compressible gasket 35 is secured to the edge of the door in order to provide a hermetic seal when the door is closed. A locking mechanism 36 with a keyhole 37 accessible at the top right edge of the molded top piece 30 is used to secure the door. Overlapping flanges 38, 39 along the peripheral edges of both the cabinet and the door prevent the introduction of a prying tool between those two components. Mounted behind the top door piece 30 is a fluorescent light fixture 40. Mounted against the back upper portion of the bottom door piece 31 is an electronic module 41 which includes the display 5, the keypad 6, the card reader 8 and the electronic control circuit for the operation of the machine. An aperture 42 in the lower portion of the bottom piece provides access to the pocket 9 into which falls the purchased goods. The aperture is secured by a swinging door 43. When the door is pushed inwardly to gain access to the goods in the pocket, it prevents access to the chute 27 and any of the goods held in the cells of the magazine.

The currency acceptor 7 is mounted against the right wall of the liner 22. A two-section channel 44 acts as a coin slot from the right pillar 33 of the door to the inlet of the currency acceptor. A coin chute 45 connects the outlet of the currency acceptor to a coin receptor box 46 in the base 47 of the magazine.

Figure 3:
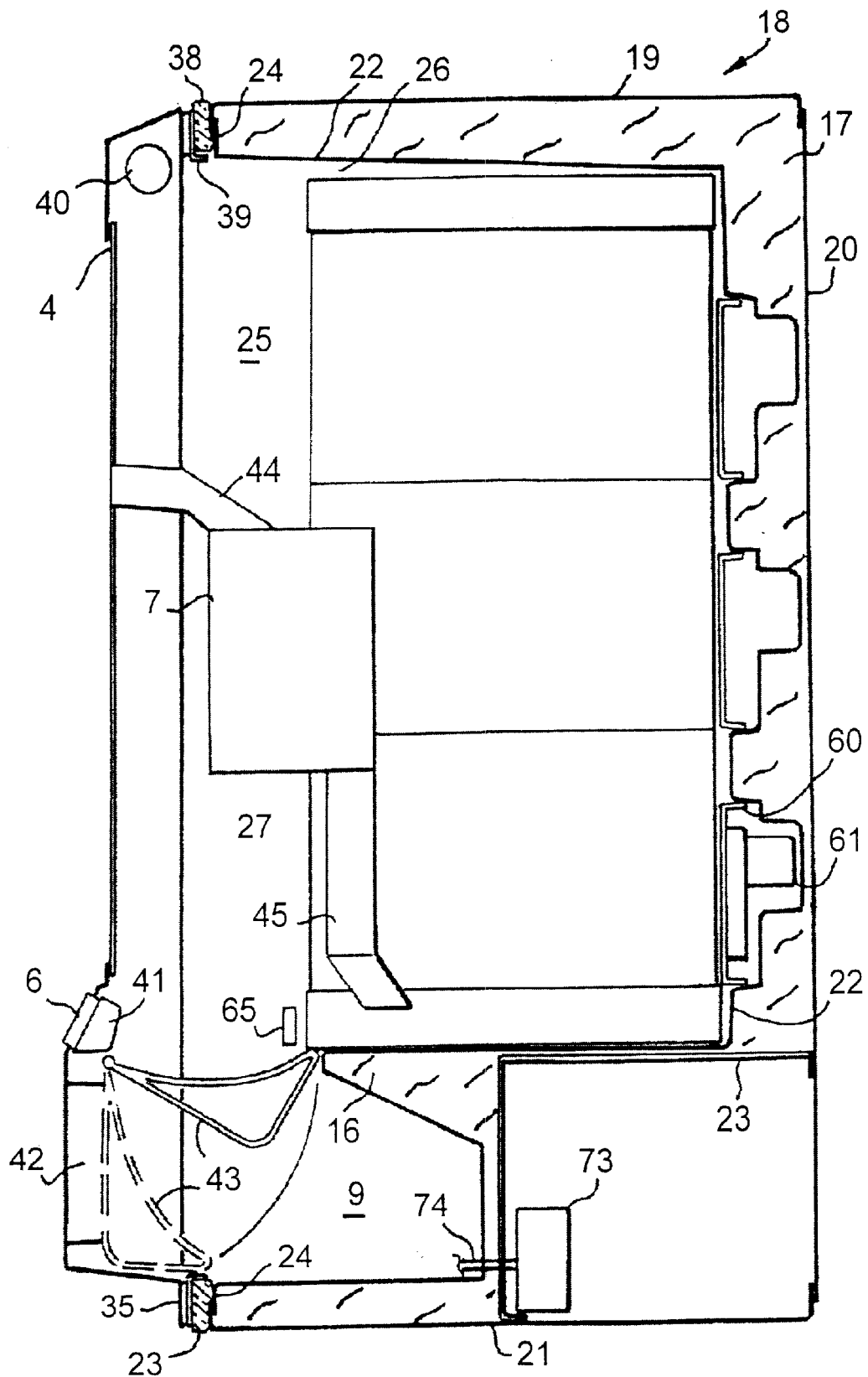
FIG. 3 is a cross-sectional view taken along line 3—3 of FIG. 1.
Figure 4:
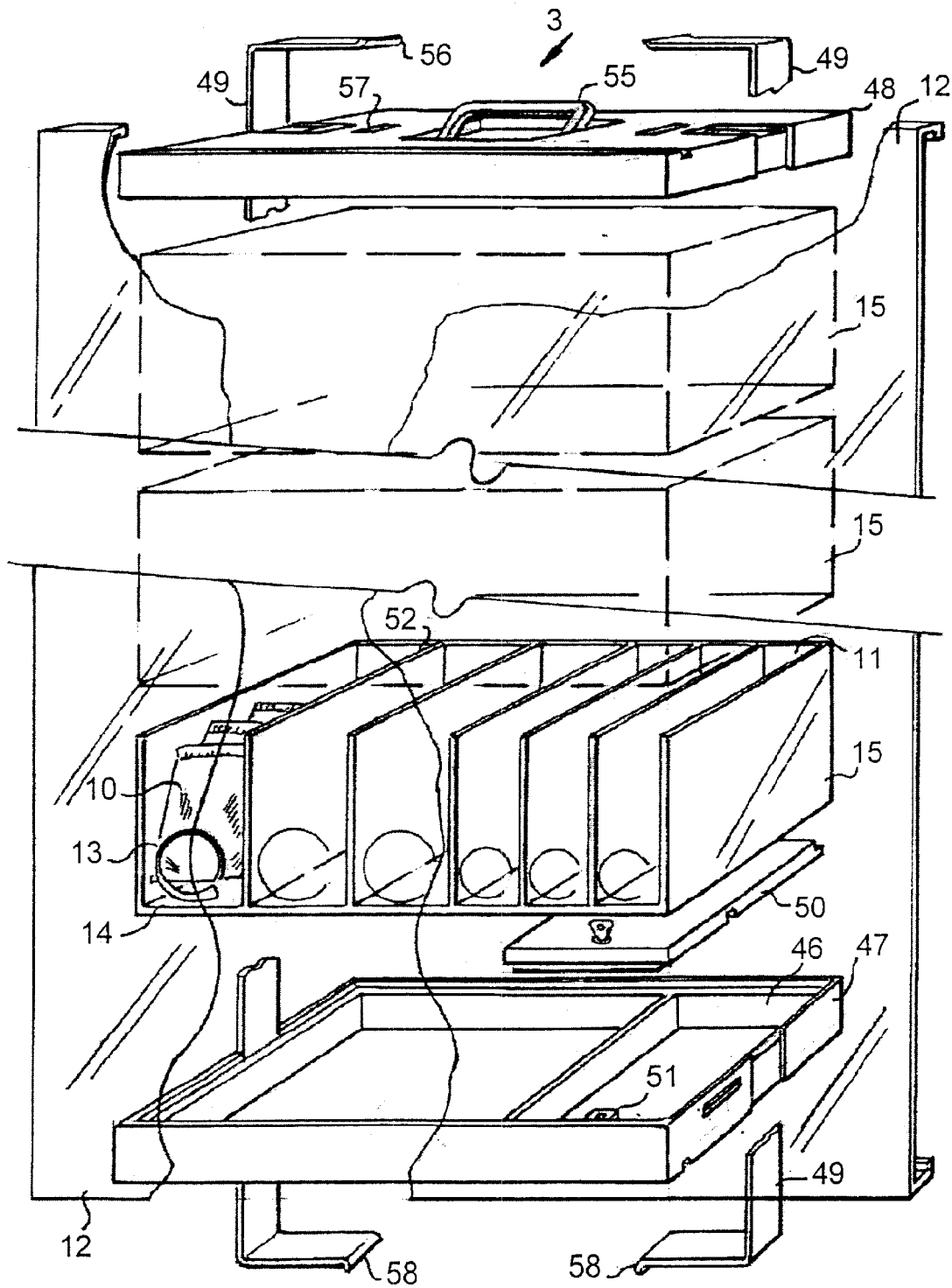
FIG. 4 is an exploded perspective view of the magazine.

As more specifically illustrated in FIGS. 3 and 4, the magazine comprises the base 47 three goods-holding trays 15, a cover 48 and a pair of locking straps 49 holding all those components together. The coin receptor box 46 which occupies the right portion of the base is closed by a lid 50 secured by a lock 51. In each station or cell 11 of the trays, the back end of the spiral rack 13 is connected to a short shaft that passes through the back wall 52 of the tray where it is supported by a bearing. The shaft has a female coupling 53 shaped and sized to be engaged by a corresponding male coupling 54 of a driving mechanism. When the spiral rack is rotated 360° by the drive mechanism, one of the goods 10 is selectively expelled from its cell and falls into the pocket 9 below. The cover 48 has a folding handle 55 in its center for conveniently carrying the magazine. The locking straps 49 are shaped and dimensioned to intimately cinch the other components of the magazine together. Their crooked left ends 56 lock into mating recesses 57 in the top of the cover 48. At the bottom ends of the straps, a similar hook end 58 locks into a similar recess in the base.

For each spiral rack, the driving mechanism consists of a motor assembly 60 including a control circuitry which allows the motor to make only one revolution every time it is energized. A gang of six motor assemblies packaged in a sealed driving module 61 is mounted in recesses 62 in the liner's back wall behind each tray 15.

The wirings of the motor assembly in each driving module are brought to a pigtail connector 63A that mates with a corresponding connector 63B on the main wiring harness 63 leading to the electronic control module 41 located in the cabinet door. The driving modules are held in place by snapping fasteners. Accordingly, driving modules with different numbers of motor assemblies can be quickly substituted for one another to match the composition of the trays.

A detachable cover 12 is attached to the front of the magazine, in order to close all the access ports 14 during transportation to and from the central service facilities.

An electronic sensor 65 in the chute 27 detects the passage of the goods toward the distributing pocket. The output of the sensor is fed to the microprocessor 66 which constitutes the principal component of the electronic module 41. The microprocessor typically includes a storage memory or equivalent recording medium. An infrared transceiver 68 provides access to the micro-processor data. This transceiver may be used by a service person to read useful information such as money paid, and goods sold using a wireless phone or any other type of hand-held downloading device well known to persons skilled in the art of data-processing, that can provide a communication interface with various types of devices and networks according to so-called "Bluetooth" technology.

The transceiver 68 can also respond to an order for goods and payment therefor from similar wireless communication devices.

It can now be understood that once a user has made a selection by dialing on the keypad 6 the identification of the station holding the desired type of goods, the good-extracting mechanism servicing that particular station can then be activated to cause the goods most frontally located on the spiral rack to fall through the chute 27 into the dispensing pocket 9.

Figure 8:
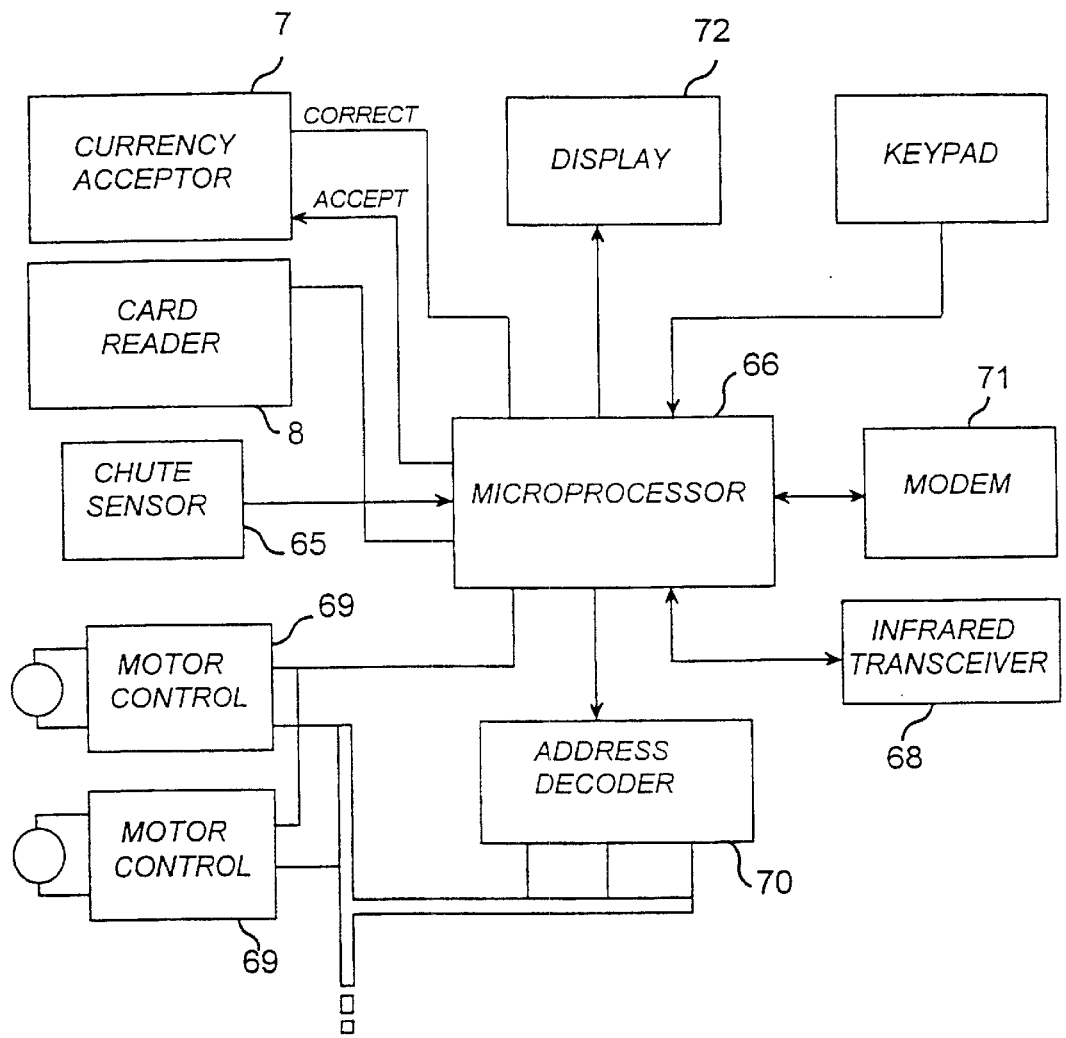
FIG. 8 is a block diagram of the electronic control system.
Figure 9:
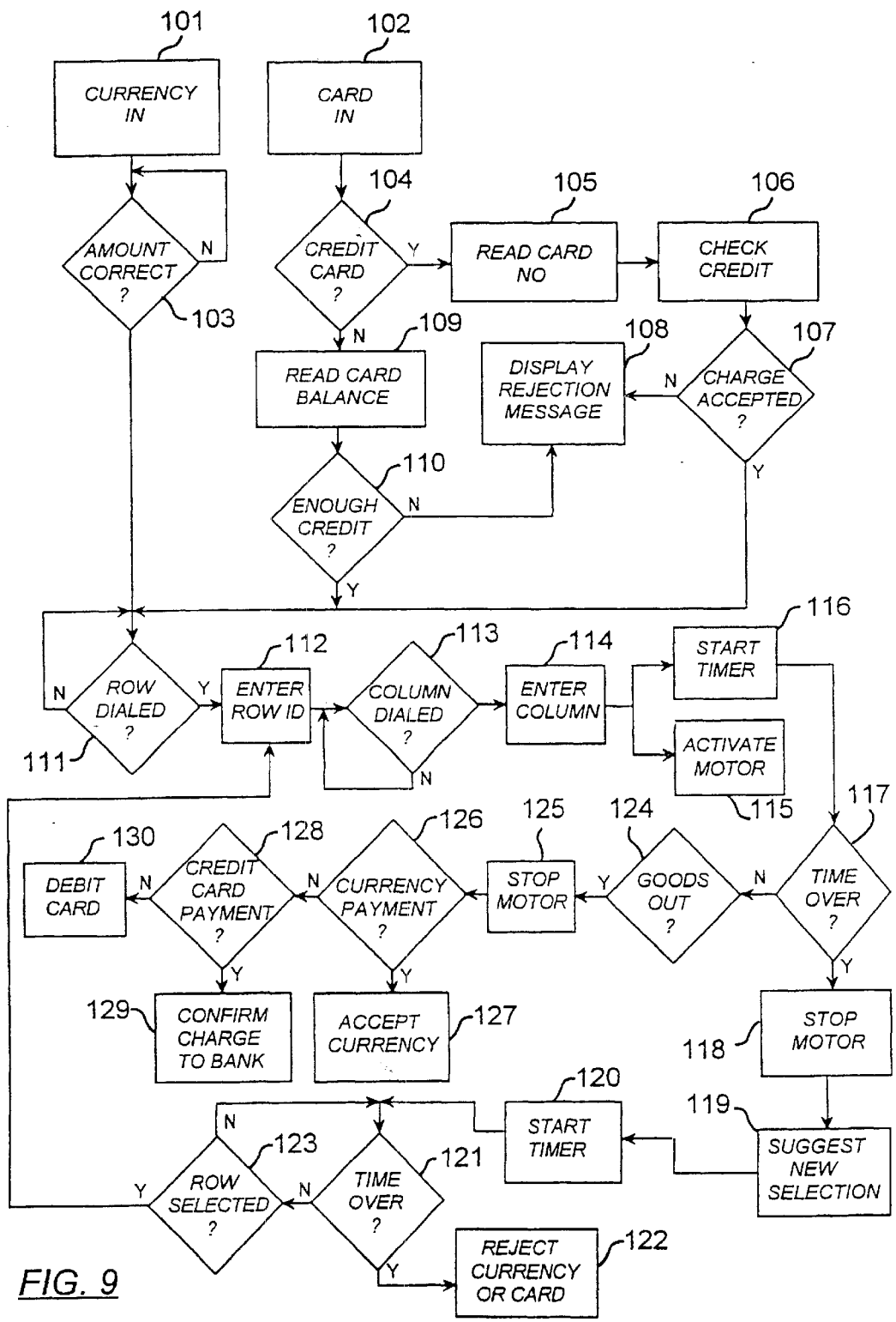
FIG. 9 is a flow diagram of the machine operation.

As shown in FIGS. 8 and 9, the operation of the vending machine is controlled by the microprocessor 66. The motors are controlled by motor-control modules 69, and the address-decoder 70. The motor-control modules and the address decoder consist essentially of gated current drivers, that, under control of the microprocessor, feed the forward current to the two appropriate motor. A modem 71 provides the communication interface to the microprocessor via conventional phone carrier services and/or via the Internet. An LCD message display 72 which is part of display 5 in the cabinet door is used to suggest to the user an alternate selection when the selected items is not available and to give other notices as will be explained below. A power supply 73 is housed under the angled palte 28. A wire harness 74 connecting the power supply to the light 40 and to the electronic module 41 is the only component that passes through the liner 22.

As more specifically illustrated in FIG. 9, the operation of the machine begins when the currency-acceptor detects that currency has been entered 101, when a payment card has been inserted 102 or when an alternate form of payment such as an electronic transfer through the Internet, or out of a palm-held wireless device. In case of payment by currency, once the correct amount has been received 103, the system waits for the user to dial his choice of goods beginning with the letter corresponding to the proper row. In the case of a payment by card, the system first determines whether it is a credit card 104. In that case, the card owner's identification is read 105, and a credit check is initiated 106 via the modem 71. If credit is refused, the user is so advised by the display 108 of a rejection message. If the credit card owner has sufficient credit, the system waits for the user's selection. If the card is not a credit card, the system assumes that it is a debit, or so-called "smart card", and reads the card for the available balance 109. If the balance is not sufficient to pay for one of the offered goods, a rejection message is displayed 108. If that balance is sufficient to cover a purchase 110, the system waits for the user's selection.

Once the user has selected a row 111, that row identification is entered 112 into the microprocessor. The system then waits for the dialing of the appropriate column 113. When the column is dialed, its identification is entered into the computer 114. At that point, the corresponding motor is started 115 and, at the same time, a ten-second timer is also started 116. If the timer expires 117 before the electronic sensor 65 detects the passage of goods into the dispensing pocket, the motor is stopped 118 and a message suggesting an alternate selection 119 is displayed. A twenty second timer is also started 120. If that timer runs out 121 before a new row letter is dialed by the user, the magnetic card or the currency which has been introduced into the machine, is rejected 122. If a row letter is dialed before the expiration of the timer 123, the system proceeds with the entering of the row identification 112; then the column identification 114 as previously described. If the electronic sensor 65 detects the passage of the goods 124 before the ten-second timer runs out, the motor is stopped 125. In the event of payment by currency 126, the currency is accepted 127 and dropped into the currency receptacle 46. In case of payment by credit card 128, the charge is confirmed to the bank 129 via the modem 71. In case of payment by "smart card", the card is debited 130 by the price of the goods.

The modem 71 can be used to communicate via the Internet with a warehouse or other type of control center, in order to provide information about the status of the vending machine such as the amount of goods already sold, proceeds received including the exact amount of currency which is now stored in the currency receptacle 46. The microprocessor is programmed according to well-known techniques to initiate that kind of communication at preset intervals or specific times through a conventional phone network or via the Internet. The machine activities and sale data that is compiled by, and stored by the microprocessor can be down-loaded on site by the service personnel on a recording medium, such as a smart-card, that is returned to the central location along with the expanded magazine. Alternately, the microprocessor can respond to polling calls initiated from the control center. From the information thus received at the control center, the most appropriate time when servicing personnel should be dispatched to exchange the magazine of the machine can be determined. Moreover, the amount of money held in the currency receptacle, as well as the amount of goods remaining in the magazine are already known and can be verified upon receipt of the magazine. Any tampering or pilfering by the service personnel can thus be abated.

The preferred embodiment of the vending machine has a total height of 85 centimeters (33.5 inches), a total width of 72.5 centimeters (28.5 inches), and a total depth of 57 centimeters (22.5 inches), and an approximate weight of 34 kilograms (75 pounds), including an empty magazine. Such a vending machine can be easily transported and installed on a table or counter top where it occupies no more than 0.5 square meters (5.4 square feet).

Figure 5:
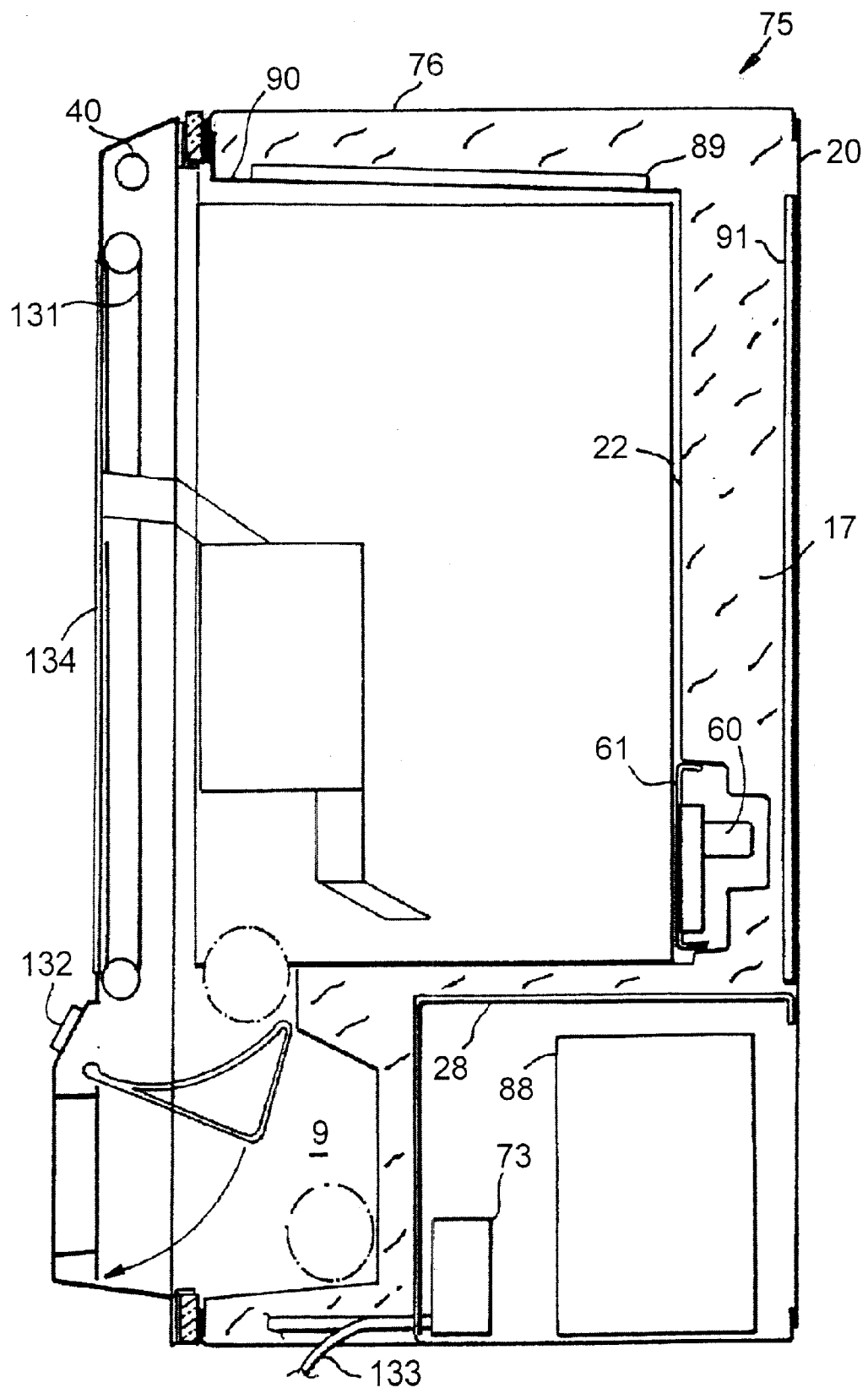
FIG. 5 is a cross-sectional view of the beverage vending machine.
Figures 6, 7:
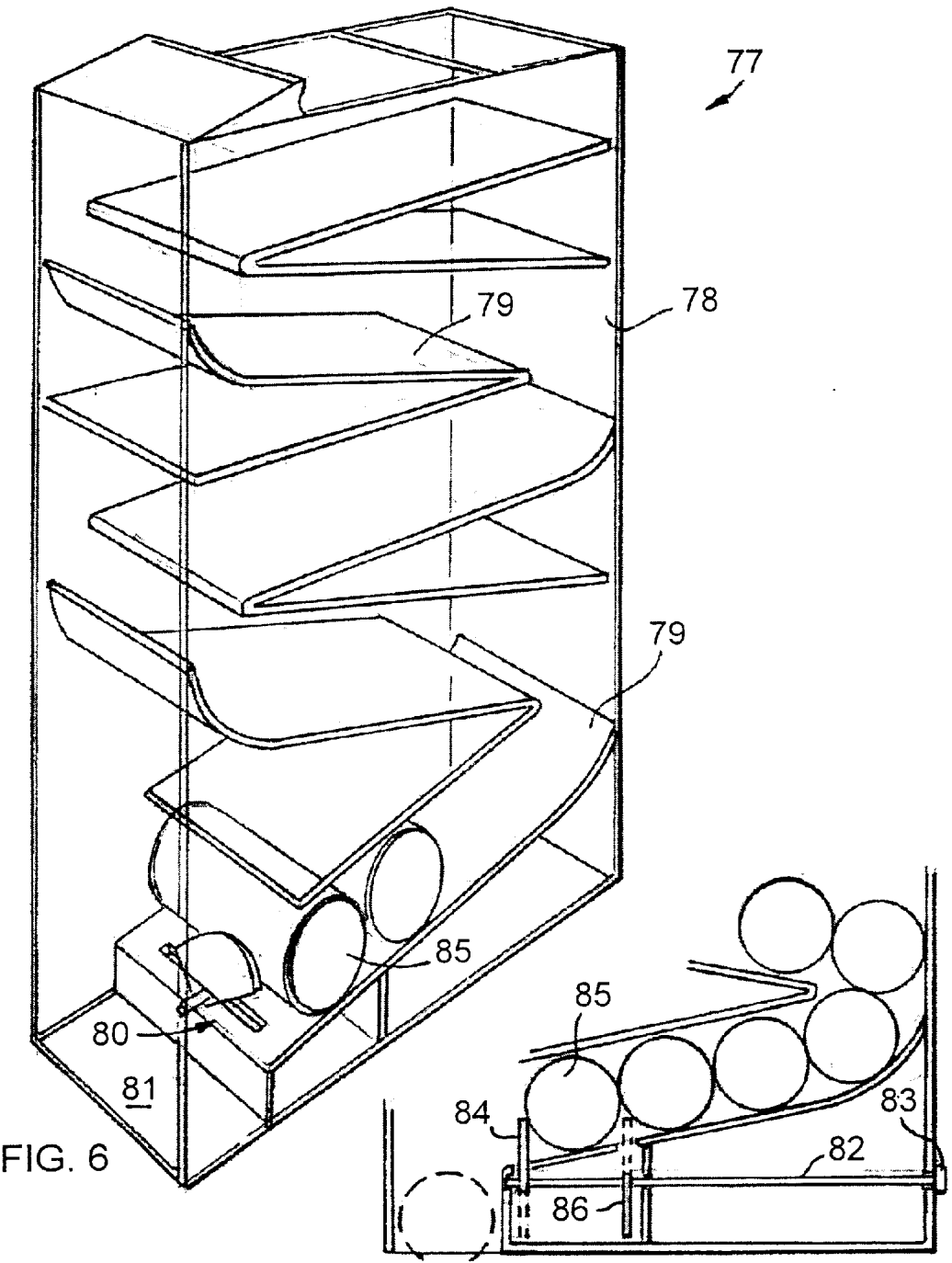
FIG. 6 is a perspective view of a beverage can magazine.
FIG. 7 is a side view of the gate mechanism.

The previously described vending machine 1 intended to dispense a variety of snack foods can be advantageously combined with a similar machine 75 intended to dispense beverage cans, more specifically illustrated in FIGS. 5–7. The beverage dispensing machine uses a cabinet 76 which is essentially similar to the one of the snack-vending machine, except that there is no currency acceptor, but accepts four side-by-side can magazines 77. Each magazine is driven by only one motor assembly 60. Accordingly, there is only one motor-driving module 61 mounted against the load compartment section of the liner 22.

In each of the four magazines 77 up to twenty-four 12 ounce beverage cans are laid down one behind the other in a zig-zagging channel of a single cell 78. The channel has five directionally alternating sections whose slanted, product-supporting floors urge the can to roll toward a dispensing gate mechanism 80. Beyond the gate an opening 81 in the bottom of the magazine allows the dispensed can to drop into the dispensing pocket 9. The gate mechanism 80 comprises a horizontal shaft 82 joined to a coupling 83 in a lower section of the magazine back wall. This coupling is similar to the one used in connection with the spiral rack shaft of the first machine and is shaped and dimensioned to engage a corresponding coupling of one of the motor assemblies 60. At the opposite end of the shaft, a first fan-shaped barrier is radially mounted so that when the shaft is rotated, this first barrier rises across the path of the lowermost can 85 in the channel. A second fan-shaped gate 86 is radially mounted on the shaft 82 in a direction opposite to that of the first barrier 84, and at an axial distance corresponding approximately to the diameter of the can. Accordingly, when the first barrier is lowered by a 180° rotation of the shaft 82, the second barrier rises between the first can 85 and the second can 87 positioned immediately behind it. As the first can rolls out of the magazine through the opening 81, the second can is held back by the second barrier 86 until the shaft completes a full rotation. At which time, the second barrier 86 is lowered below the slanted floor 79. The second can 87 rolls down until it is stopped by the now raised first barrier 84. Under the pull of gravity, all the remaining cans in the magazine roll down one position. The mechanism is now ready for expelling the second can. The beverage can dispensing machine 75 includes a refrigerating assembly comprising a compressor 88 mounted under the angled plate 28, a cooling coil 89 mounted against and above the ceiling portion 90 of the liner, and a condenser 91 mounted against the inner side of the back sheet 20.

A power supply 73 is housed under the angled plate 28 next to the condenser. It should be noted that the same cooling assembly can conveniently be provided in the snack-vending machine 1.

It should also be noted that except for the passageway for the harness 74, the liner 22 forms a seamless, hole-free wall surface. The harness passageway is automatically sealed when the insulating foam material is injected. Accordingly, the inside of the load compartment and pocket can conveniently be cleaned and and sanitized with strong detergents or a germicidal solution. The absence of any metallic component or sensitive mechanism greatly expedites maintenance of the machines, and and enhances their reliability. If necessary, during cleaning and sanitization, the driving module 61 and the currency receptor 7 can conveniently be pulled out and disconnected from the harness 74.

The use and profitability of the vending machine can be substantially increased by combining it with a programmable scrolling display of the type disclosed in U.S. Pat. No. 5,493,802 Simson, which patent is hereby incorporated in this specification by this reference.

As illustrated in FIG. 5, a scrolling display 131 is preferably incorporated into the door of an auxiliary vending machine unit 75 that dispenses only beverages. The beverage-dispensing machine does not require a transparent door to view the various available items. The type of available beverages can be indicated on a picture sign 132 located above the distribution pocket 9.

The selection of the beverage and payment therefor is done on the keypad 6 and by using the card reader 8 or currency acceptor of principal machine 1. A simple umbilical cable 133 connects the two machines. A wide variety of enticing messages can be carried on the scroll 134 of the display. The messages on the scroll are exposed for several seconds per frame in a continuous mode of operation. Some messages may tout special packages combining a food item from the principal machine with a drink from the auxiliary machine at a reduced price. The display can also be programmed to match the message with the time of the day. Sandwiches and puddings may be emphasized around lunch or dinner time while candies and cookies are promoted during coffee breaks. The operation of the scrolling display is controlled by the microprocessor 66 operating under well-known programming routines. Entry of program commands can be made through the card reader 8, via the modem 71, or through wireless communication.

While the preferred embodiments of the invention have been described, modifications can be made and other embodiments may be devised without departing from the spirit of the invention and the scope of the appended claims

What is claimed is:

1. A vending machine which comprises:

an external shell having top, bottom and opposite side walls, and an open front;

an internal plastic liner nested within said shell and joined thereto about a peripheral frontal edge, said liner defining a load compartment;

a volume of insulating material sandwiched between said shell and liner;

a door releasably closing said open front, and including a front panel and a peripheral flange meeting said shell and liner about said frontal edge;

at least one product magazine removably held within said load compartment;

means, within said magazine, for selectively expelling therefrom a variety of products stored therein;

driving means, within said load compartment, engageable by said means for expelling;

control means responsive to user-initiated signals for activating said driving means; and means for generating said signals.

2. The vending machine of claim 1, wherein said magazine comprises:

at least one cell shaped and dimensioned to hold a plurality of substantially similarly-sized products, said cell having an opening spaced apart from said front panel; and said means for expelling comprise a drive shaft engageable from a back section of said magazine opposite said opening.

3. The vending machine of claim 2, wherein said driving means comprises at least one electro-mechanical device mounted against said liner and positioned for engagement with said drive shaft when said magazine is placed into said load compartment.

4. The vending machine of claim 3, wherein said electro-mechanical device comprises a motor.

5. The vending machine of claim 4, wherein said means for expelling further comprise a spiral rack coupled to said shaft.

6. The vending machine of claim 4, wherein said means for expelling further comprise a gate coupled to said shaft, and shaped, dimensioned and positioned to selectively block said opening.

7. The vending machine of claim 6, wherein said cell comprises a slanted product-supporting floor positioned to urge products held therein toward said gate.

8. The vending machine of claim 7, wherein said gate comprises:

a first barrier radially connected to said shaft; and a second barrier radially connected to said shaft opposite and axially distally from said first barrier;

whereby a 180° rotation of said shaft lowers said first barrier, allowing a first of said products to escape said cell while a second of said products immediately behind said first is held back within said cell by said second barrier.

9. The vending machine of claim 1, wherein said control means comprise an electronic data entry module mounted in said front panel.

10. The vending machine of claim 9, wherein said data entry module comprises a keypad.

11. The vending machine of claim 1, wherein said control means comprise an electronic data receiving module.

12. The vending machine of claim 1, wherein said liner further defines a product-receiving pocket below said load compartment.

13. The vending machine of claim 12, wherein said said front panel has an aperture providing access to said pocket.

* * * * *